United States Patent [19]
Ritter et al.

[11] Patent Number: 5,120,932
[45] Date of Patent: Jun. 9, 1992

[54] AUTOMATIC DEFROSTER SYSTEM HAVING BLOWER MOTOR AND HEATING ELEMENT CONTROL CIRCUITS

[75] Inventors: Bernhard Ritter, Pforzheim; Dieter Fahrlaender, Eberdingen, both of Fed. Rep. of Germany

[73] Assignee: Dr. Ing. h.c.F. Porsche AG, Fed. Rep. of Germany

[21] Appl. No.: 627,778

[22] Filed: Dec. 14, 1990

[30] Foreign Application Priority Data

Jan. 16, 1990 [DE] Fed. Rep. of Germany ....... 4001054

[51] Int. Cl.⁵ .......................... B60H 1/00; F24H 9/20; H05B 1/02; B60R 16/02
[52] U.S. Cl. ...................................... 219/202; 392/379
[58] Field of Search ................ 392/379, 360-369, 392/347; 219/202-203; 439/845, 849, 850; 361/384, 426, 407, 396, 431

[56] References Cited

U.S. PATENT DOCUMENTS

| | | | |
|---|---|---|---|
| 2,552,028 | 5/1951 | Blair | 361/426 |
| 2,689,372 | 9/1954 | Goulding, Jr. et al. | 392/379 |
| 3,534,197 | 10/1970 | Burnett | 392/360 |
| 3,659,155 | 4/1972 | Chambers | 392/360 |
| 3,912,906 | 10/1975 | McIntosh et al. | 392/360 |

FOREIGN PATENT DOCUMENTS 3719639 12/1988 Fed. Rep. of Germany.

*Primary Examiner*—Bruce A. Reynolds
*Assistant Examiner*—John A. Jeffery
*Attorney, Agent, or Firm*—Evenson, Wands, Edwards, Lenahan & McKeown

[57] ABSTRACT

An electric heating element for the elimination of condensation, frost or the like on windows of motor vehicles, preferably a rear window of a convertible top, is interconnected with an electric blower motor which includes a relay circuit. For safely operating the heating element, the heating element will only be operative when the blower motor is running. A first relay is used for the control of the blower motor and a second relay for the control of the heating element. The second relay, via a line of a control circuit, is connected to a connecting terminal of the blower motor.

6 Claims, 1 Drawing Sheet

AUTOMATIC DEFROSTER SYSTEM HAVING BLOWER MOTOR AND HEATING ELEMENT CONTROL CIRCUITS

BACKGROUND AND SUMMARY OF THE INVENTION

This invention relates to an electric blower motor and, more particularly to an electric blower motor having an interconnected electric heating element for eliminating condensation, frost or the like on windows of motor vehicles, e.g. a rear window of a convertible top. The blower motor includes a circuit which has a relay.

A known electric window defroster system for a motor vehicle is disclosed in German Patent Document DE-OS 37 19 639 in which a heating resistor, by way of a control unit and a relay, is supplied with operating current only when a voltage is fed to a connecting line of a fan motor.

There is needed a circuit for an electric blower motor, including an electric heating element, which has a simple construction and, still stands out due to its high operational reliability.

The present invention meets this need by providing an electric window defroster system having a circuit formed by a first relay for the control of the blower motor and a second relay for control of the heating element. The second relay is connected to a connecting terminal of the blower motor via a line of a control circuit.

The advantage of the present invention is that the electric heating element is safely switched off in the case of disturbances in the control or load circuit of the electric blower motor. Overheating of the heating element proper, or of adjacent parts, is prevented in this manner.

DETAILED DESCRIPTION OF THE DRAWINGS

Figure 1:
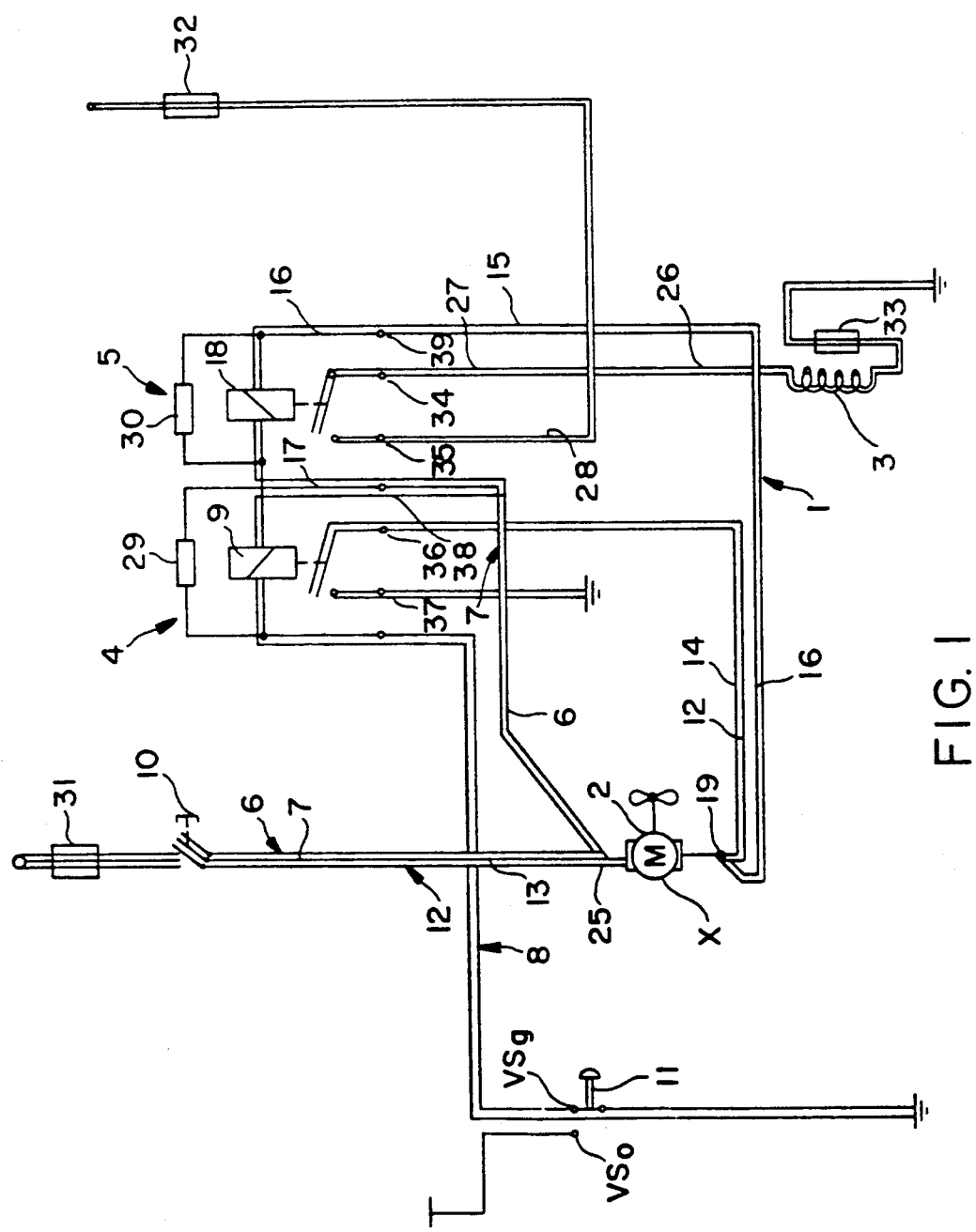
FIG. 1 is a schematic representation of a circuit for an electric blower motor having an electric heating element.

Referring to FIG. 1, a circuit 1 interconnects an electric blower motor 2 with an electric heating element 3. The blower motor 2 and the heating element 3 can be used to remove condensation, frost or the like from a rear window of a convertible top (the latter two not being shown). The circuit 1 includes a first relay 4 for control of the blower motor 2 and a second relay 5 for control of the heating element 3. The first relay 4 has a control circuit 6 including lines 7, 8 which are connected to a coil 9. An operating switch 10 is arranged in line 7 connected in front of the coil 9. In line 8, which is connected behind the coil 9, a top switch 11 is arranged by means of which switch positions $VS_g$ and $VS_o$ can be switched, i.e., $VS_g$ corresponding to the closed position of the convertible top, (when the top stretches over the passenger compartment) and $VS_o$ being the switch position in which the convertible top is open. In addition, the first relay 4 has a load circuit 12 which, by means of lines 13 and 14, is connected to the blower motor 2.

Figure 2:
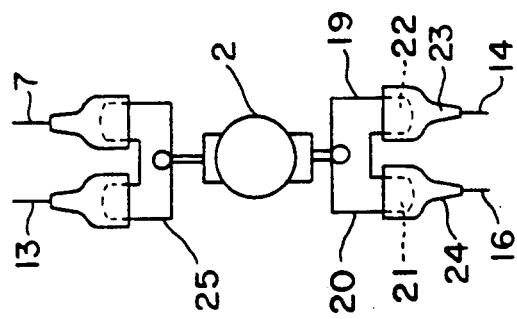
FIG. 2 is an enlarged view of detail X indicated in FIG. 1.

The second relay 5 interacts with a control circuit 15 which is applied to a coil 18 by means of lines 16, 17. Line 16 of the control circuit 15 is connected to a connecting terminal 19 of the blower motor 2 which is also connected with line 14 of the load circuit 12. The connecting terminal 19, which is arranged as closely as possible to the blower motor 2 as shown in FIG. 2, is a contact-bridge-type unit 20 which includes two receiving devices 21, 22 for separate plugs 23, 24 of lines 14 and 16. A similar construction is provided on the other side of the blower motor 2 at connecting terminal 25. Both constructions ensure that any interruption of the current to the blower motor 2 will also affect the second relay 5; i.e., the heating element 3 will then not be operative. This is because the control current side connection for the first and second relays is situated as closely as possible to the electric blower motor 2. In addition, the relay 5 is equipped with a load circuit 26 for the heating element 3. The load circuit 26 includes lines 27 and 28.

The resistors of coils 9 and 18 are indicated by reference numbers 29, 30 and are used for eliminating interferences. The circuit 1 also includes fuses 31, 32 and 33.

The two coils 9 and 18 have independent contacts 34, 35 and 36, 37. The two coils 9 and 18 are connected with a contact 38 which receives a plus signal (control current side) as soon as the operating switch 10 is shut. Coil 9 pulls up when both switches are closed shut, i.e. the operating switch 10 and the top switch 11. Under this circumstance, the blower motor 2 grounded to the vehicle body will run and, at the same time, connection 39 is grounded through the coil 18, wherein the heating element 3 receives and is energized by the current. Because of this circuit, the connecting of the heating element 3 will only take place if the fuse 31 is operative, switches 10 and 11 are shut, and lines 13, 7 and 16, 14 are properly connected with the connecting terminals 19, 25.

What is claimed is:

1. In an electric defroster system for a motor vehicle with an electric blower motor having first and second connecting terminals and an interconnected electric heating element for eliminating condensation and frost, the improvement comprising:
    a convertible top for the motor vehicle; and
    a circuit including
    a first relay, activated in response to closing of a main operating switch and said convertible top being in an extended position, said first relay controlling said electric blower motor by providing a circuit path to ground connection from the second connecting terminal of said electric blower motor wherein current applied to the first connecting terminal energizes said electric blower motor;
    a second relay coupled at one end to the current applied to the first connecting terminal and at another end to the second connecting terminal of said electric blower motor for controlling said electric heating element, wherein said second relay is closed to energize the electric heating element after said first relay closes to energize the electric blower motor.

2. An electric blower motor according to claim 1, wherein said circuit further includes an operating switch and a top control switch.

3. An electrical blower motor according to claim 2, wherein said first and second connecting terminals of said electric blower motor for the first and the second relays each include a connecting unit having two receiving devices for receiving separate plugs coupled to conducting lines of both relays.

4. An electric blower motor according to claim 1, wherein said first and second relays include a control-current-side connection situated as closely as possible to said electric blower motor.

5. An electric blower motor according to claim 4, wherein said first and second connecting terminals of said electric blower motor for the first and the second relays each include a connecting unit having two receiving devices for receiving separate plugs coupled to conducting lines of both relays.

6. An electric blower motor according to claim 1, wherein said first and second connecting terminals of said electric blower motor for the first and the second relays each include a connecting unit having two receiving devices for receiving separate plugs coupled to conducting lines of both relays.

* * * * *